Sept. 16, 1958 N. L. PAPPAS 2,852,743
ELECTRONIC RATIO METER
Filed July 23, 1954 2 Sheets-Sheet 1
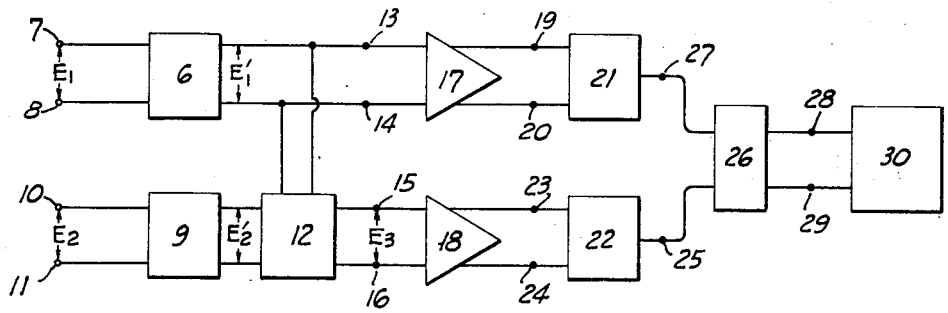
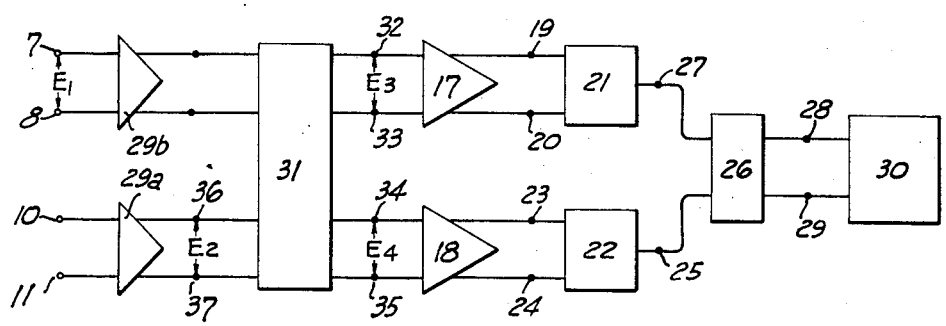
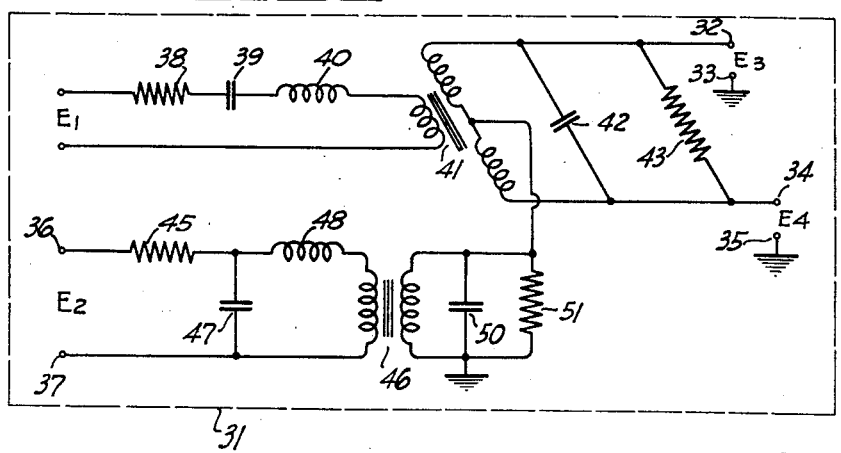
INVENTOR.
Nicholas L. Pappas
BY
ATTORNEYS Sept. 16, 1958      N. L. PAPPAS      2,852,743
ELECTRONIC RATIO METER
Filed July 23, 1954      2 Sheets-Sheet 2
FIG_4A_
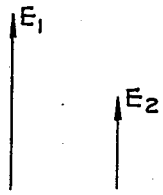
FIG_4B_
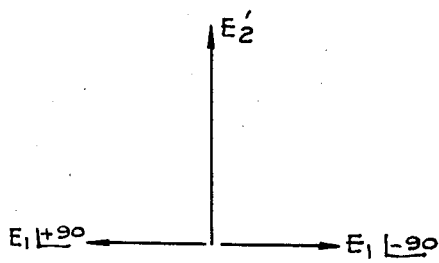
FIG_4C_
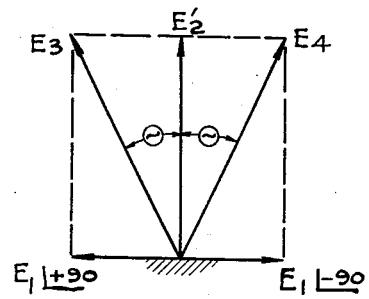
INVENTOR.
Nicholas L. Pappas
BY
ATTORNEYS

United States Patent Office 2,852,743
Patented Sept. 16, 1958

2,852,743

ELECTRONIC RATIO METER

Nicholas L. Pappas, Los Altos, Calif., assignor to Hewlett-Packard Company, Palo Alto, Calif., a corporation of California Application July 23, 1954, Serial No. 445,313

16 Claims. (Cl. 324—140)

This invention relates to electronic apparatus for detecting and measuring the ratio of the amplitudes of two signals.

In the testing and operation of various high frequency systems it is frequently desirable to measure or indicate the relative amplitude of two signals. For example, such a measurement can be applied to indicate the characteristics of a network comprising two or more transmission paths, and for load impedance measurements. One of the simplest forms of a ratio detector is an oscilloscope connected to receive one signal on its horizontal deflecting plates, and a second signal on its vertical plates. Two in-phase sinusoids so applied will cause a straight line Lissajou figure to appear on the scope, with the slope of the line being proportional to the ratio of the two signal voltages. This method is unsatisfactory where accurate measurements are desired. It is subject to the disadvantage that it is inherently difficult to obtain an accurate measure of the slope, and this difficulty is accentuated for greater differences in signal amplitude.

One particular type of ratio detector is what is known as a microwave reflectometer, which is a device for measuring the amplitude of the reflection coefficient of an unknown load. A microwave oscillator such as a reflex Klystron is modulated at an audio rate, usually with a one kc./s. square wave, and the signal is transmitted down a uniform transmission line to the unknown load. Two directional couplers are employed to sample the incident and reflected waves in the transmission line leading to the load. The outputs of the directional couplers are rectified by crystals operating as square law devices. Thus, two one kc./s. voltages are derived, one having an amplitude proportional to the incident wave and one proportional to the reflected wave, with both voltages being in phase. The reflection coefficient is equal to the square root of the ratio of these two voltages. A reflectometer of this general type is disclosed in copending application, Serial No. 434,620, filed June 4, 1954. Apparatus of this kind necessitates relatively accurate means for measuring the ratio of these two voltages, if the apparatus is to be applied for relatively accurate determination of load impedances, and the use of an oscilloscope for this purpose has many disadvantages.

In general it is an object of this invention to provide apparatus for measuring the ratio of the amplitudes of two in phase signals to a high degree of accuracy.

A further object of the invention is to provide apparatus of the above character having a maximum possible amplitude ratio of the order of 80 db and where the available signal power for the strongest signal may have variations of the order of 20 db.

A further object of the invention is to provide a ratio detector suitable for use in a microwave reflectometer.

Additional objects of the invention will appear from the following description in which the preferred embodiment has been set forth in detail in conjunction with the accompanying drawing.

Referring to the drawing:

Figure 1 is a block diagram of one embodiment of the invention.

Figure 2 is a block diagram of another embodiment of the invention.

Figure 3 is a circuit diagram of a circuit employed in the embodiment of Figure 2.

Figures 4A, 4B and 4C are vector diagrams of certain of the voltages in the circuit of Figure 3.

The apparatus of the present invention performs the same general functions as an oscilloscope arrangement such as previously described, but in a different manner and with a high degree of accuracy. In accordance with the present invention, the phase of the first signal voltage is shifted 90-degrees relative to the second signal. The two 90-degree out-of-phase voltages are then added, and the phase angle between the second signal voltage and the resulting sum voltage is measured in a novel manner to provide an accurate indication of the relative amplitude of the two original signals.

As will be presently explained, the invention makes it possible to measure the ratio of two signal voltages. The ratio measured is independent of the absolute value of the strongest signal as long as this signal is within the range of 3–100 mv. This is not a final limitation. Apparatus can be constructed for any desired dynamic range.

Figure 1 is a block diagram showing an embodiment of my invention. As shown in this figure, tuned circuit 6 receives the signal voltage $E_1$ from terminals 7 and 8 and tuned circuit 9 receives the signal voltage $E_2$ from terminals 10 and 11. Network 12 is connected to receive the output $E_1'$ of circuit 6 and $E_2'$ of circuit 9. The output at terminals 13 and 14 of tuned circuit 6 are connected to the amplifier 17. The output terminals 15 and 16 of the network 12 are connected to the amplifier 18. The output terminals 19 and 20 of amplifier 17 are connected to the amplitude comparison circuit 21. Amplitude comparison circuit 22 is connected to amplifier 18 through terminals 23 and 24, and has output terminal 25 connected to one input of a bistable square wave generator 26, which preferably is a flip-flop circuit. The other input terminal 27 of flip-flop circuit 26 is connected to the output of amplitude comparison circuit 21. The output voltage of the system appears at the two output terminals 28 and 29 of flip-flop circuit 26.

The operation of the apparatus of Figure 1 is as follows: In-phase signals $E_1$ and $E_2$ are applied at terminals 7, 8, and 10, 11, respectively. These signals may have any waveform whatsoever, as long as their fundamental frequency lies within the pass band of the circuits 6 and 9.

Networks 6 and 9 are tuned circuits designed to pass a narrow band of frequencies. The signals $E_1'$ and $E_2'$ therefore will have similar waveshapes having the fundamental frequency of the input signal and having amplitudes which are proportional to the amplitude of the input signals. Network 12 contains elements arranged to shift the phase of $E_1'$ by 90-degrees. It is only necessary to provide the correct phase shift over a very narrow band of frequencies, corresponding to the pass band. Hence, a number of techniques are available for providing the desired 90-degree phase shift. One such method is by use of a double band tuned circuit such as will be presently explained in connection with Figure 3.

After $E_1'$ has undergone a 90-degree phase shift, it is added to $E_2'$ and the resultant signal $E_3$ appears at terminals 15 and 16. The remainder of the circuit Figure 1 comprises suitable means for measuring the relative phase angle between $E_1'$ and $E_3$. The ratio of the amplitude of $E_2$ to $E_1$ is simply the tangent of this angle.

Amplifiers 17 and 18 can be AVC amplifiers with typically of the order of 80 db maximum gain. These amplifiers take the millivolt signals available, typically from a crystal detector, and amplify them to operate the amplitude comparison circuit. The only information of importance at the input to amplifiers 17 and 18 is the relative phase between $E_1'$ and $E_3$. It is unimportant what happens to the amplitudes of $E_2'$ and $E_3$. Thus, the gain of the AVC amplifiers 17 and 18 may be made appropriate to always provide an optimum signal for the amplitude comparison circuits 21 and 22.

The amplitude comparison circuits 21 and 22 may be blocking oscillators that go into oscillation when a decreasing applied signal passes through a predetermined amplitude. A pulse is produced at the output with fast rise time when the circuit starts into oscillation. This type of circuit is well known in the art and is commonly called a "Multiar" circuit. It has been described in detail in the literature. See, for example, volume 19, Radiation Laboratory Series, McGraw-Hill Publishing Company, 1949, page 343. The output pulse from the amplitude comparison circuit may be arranged to occur when the applied signal passes through zero voltage, making the occurrence of the pulse essentially independent of the amplitude of the applied signal. Thus, each time $E_1'$ passes through zero in the negative direction, a pulse is produced at terminal 27, and each time $E_3$ passes through zero in a negative direction, a pulse is produced at terminal 25. These pulses are displaced in time by an amount directly proportional to the phase angle between $E_1'$ and $E_3$. Therefore it will be evident that the comparison circuit constitutes means for deriving pulses that are accurately displaced in time as a function of the phase angle between $E_1'$ and $E_3$.

The flip-flop circuit 26 is a bistable vacuum tube multivibrator and is also a type of circuit well known in the art. See for example, volume 19, Radiation Laboratory Series, McGraw-Hill Publishing Company, 1949, page 164. A pulse from terminal 27 "flips" or triggers the flip-flop circuit 26 into a condition in which the positive voltage appears at terminal 28, and a pulse from terminal 25 "flops" it back into a state where, say, both terminals 28 and 29 are at zero voltage. The voltage waveform between terminals 28 and 29 is then a series of pulses of equal amplitude but having a duration proportional to the phase. The average value of the waveform is directly proportional to the phase angle between $E_1'$ and $E_3$. When the phase angle is 90-degrees, i. e., $E_1$ and $E_2$ are equal, the waveform has maximum average value. A lowpass filter may be employed to obtain the average value of the output waveform and the resulting D. C. voltage can be used to deflect a suitable meter.

Certain modifications may be made in the circuit of Figure 1 which improve the dynamic range of operation and permit greater accuracy of readings. Figure 2 is a block diagram of a balanced circuit which gives the improved performance. Referring to Figure 2, input terminals 7, 8, 10 and 11 are as before, but terminals 10 and 11 supply the input to a step adjustable linear amplifier 29a whose gain may be varied in 20 db steps for switching meter ranges. This amplifier may be conveniently designed to provide from 0 to 80 db gain in 20 db steps, thereby restricting the required range of operation of the remainder of the circuit to 20 db, i. e., the signal on terminals 10 and 11 may always be amplified to provide a signal $E_2$ at the output of amplifier 29a on terminals 36, 37 that is not over 20 db smaller than $E_1$. Then, within the 20 db range to be measured, the ratio of $E_2$ to $E_1$, can be determined with considerable accuracy. Terminals 7 and 8 supply a cathode follower 29b which provides a high input impedance and a low driving source impedance for the balanced network 31.

The balanced network 31, presently to be described, is employed in this circuit to perform the functions of extracting the fundamental shiftings $E_1'$ by 90-degrees, and summing $E_2'$ and the shifted $E_1'$. This balance circuit has the advantage that undesired phase shifts give rise to errors in the measured ratio that are proportional to the square of the undesired phase shift, and therefore result in second order errors for small phase shifts. In the unbalanced scheme of Figure 1, undesired phase shifts cause first order errors. The network 31 gives two voltages $E_3$ and $E_4$ appearing at terminals 32, 33 and 34, 35, respectively. These voltages are applied to amplitude comparison circuits 21 and 22, and the outputs of these circuits control the waveform of flip-flop circuit 26, as previously described.

The operation of network 31 in Figure 2 to provide balanced operation, can be explained by reference to Figures 3, and 4A, 4B and 4C. Figure 3 is a circuit diagram of one form of circuit adapted to perform the operations of providing a balance 90-degree phase shift, and summing. Referring to Figure 3, voltages $E_1$ and $E_2$ are supplied to the input of network 31. Output voltages $E_3$ and $E_4$ are taken off at terminals 32, 33 and 34, 35 respectively. The series combination of resistor 38, condenser 39, inductance 40, and the primary of transformer 41 is connected to $E_1$. The parallel combination of condenser 42 and resistor 43 is connected across the secondary of transformer 41 and terminals 32 and 34 provide output terminals for the secondary of transformer 41. Resistor 45 and inductance 48 are connected between terminal 36 and one side of the primary of transformer 46. Condenser 47 is connected between the common junction of the resistor 45 and inductance 48 and the input 37. The parallel combination of condenser 50 and resistor 51 is connected across the secondary of transformer 46. One side of the secondary of transformer 46 is connected to the center tap of the secondary of transformer 41.

The operation of the circuit of Figure 3 is as follows: The series resonant circuit in the primary of transformer 41 and the parallel resonant circuits in the secondary of transformer 41 and in both windings of transformer 46 are tuned to the same frequency and are fairly high Q circuits.

The series resonant combination of resistor 38, condenser 39, inductance 40 and the primary of transformer 41 introduces a $\pi/2$ phase shift relative to the two parallel resonant circuits in the windings of transformer 46. The action of the series resonant circuit and the transformer may be thought of as introducing a $\pi/2$ phase shift in $E_1$ and converting it to a balanced voltage so that with the appropriate turns ratio and in the absence of $E_2$, $E_1'|\overline{90}$ would appear at terminal 32 and $E_1'|\overline{-90}$ at terminal 34. The two resonant circuits in the windings of transformer 46 extract the fundamental and apply the voltage to the center tap of transformer 41. By so applying the voltage, it is added to $E_1'|\overline{90}$ and $E_1'|\overline{-90}$. The relationships between the voltages is shown in Figures 4A, 4B and 4C for a typical case where $E_2$ is about half of $E_1$. Figure 4A shows $E_1$ and $E_2$ in phase. Figure 4B shows the separate voltages in the secondary of transformer 41, $E_1'|\overline{90}$ appearing at terminal 32, $E_1'|\overline{-90}$ at terminal 34 and $E_2'|\overline{0}$ at the center tap. The sum of $E_1'|\overline{90}$ and $E_2'|\overline{0}$ is $E_3$ and the voltage appears between terminals 32 and 33 (ground), while $E_1'|\overline{-90}$ plus $E_2'|\overline{0}$ appears between terminals 34 and 35 (ground), as indicated at Figure 4C. $E_3$ makes an angle $+\Theta$ with $E_2'$ and $E_4$ makes an angle $-\Theta$ with $E_2'$. The angle between the voltages $E_3$ and $E_4$ is $2\Theta$, and $E_3$ and $E_4$ are equal in magnitude for all ratios of $E_1$ and $E_2$. When $E_1$ is equal to $E_2$, the angle between $E_3$ and $E_4$ is 90-degrees.

The important result obtained by the use of this type of balanced circuit is the reduction of the effect of phase shift error in the circuit 31. If $\delta$ is the angle error the measured ratio will be equal to the actual ratio times $$\frac{(1-\delta^2)}{2}$$

for small $\delta$, for the balanced system of Figure 2. For the unbalanced system of Figure 1, the error would be $(1-\delta)$, for small $\delta$. Basically, the difference lies in the fact that an error in angle in the balanced system adds to $E_3$ but subtracts from $E_4$ so the angle between them is not affected, to the first order.

The final results is a system with a capability of measuring, with about ±2% accuracy, the ratio of two voltages. The ratio measured is independent of the absolute value of the strongest signal. By the method employed, errors in amplitude beyond the phase-shift network have no effect since the information is contained in the relative phases of the two voltages. A small source of error results from the method of determining $\pi/2$ phase shift in network 31. The parallel resonant circuits will have a different frequency dependence of resonance from that of the series circuit. If the frequency of the incoming signals deviates from the design value there will be an amplitude mismatch which causes a ratio error of a first order type. By slightly detuning the two circuits it is possible, in practice, to essentially eliminate this source of error over about a 10% bandwidth.

I claim:

1. In a ratio meter of the character described, means for extracting the fundamental signal frequency of in phase first and second input complex waves to derive first and second in phase fundamental voltages, means for shifting the phase of the first of first and second fundamental voltages by 90-degrees relative to the second, means for adding said shifted first fundamental voltage to said second fundamental voltage to produce a third fundamental voltage having a phase angle relative to said first fundamental voltage equal to the inverse tangent of the ratio of the amplitude of the second signal to the amplitude of the first signal, means responsive to said first and third fundamental voltages serving to derive a triggering pulse when said first fundamental voltage passes through zero amplitude in a negative direction and another triggering pulse when said third signal passes through zero amplitude in a negative direction, and means responsive to said triggering pulses for indicating the time displacement of said pulses to thereby indicate the ratio of amplitudes of the first and second signals.

2. Apparatus as in claim 1 in which said last named means includes a bistable flip-flop circuit responsive to said triggering pulses and serving to generate periodic pulse whose average value is proportional to the angle, and means responsive to the average voltage value of said pulses for indicating the ratio of the amplitude of said first and second signals.

3. In a ratio meter of the character described for determining the ratio of the amplitudes of first and second in phase complex waves, means for extracting the fundamental voltage of said first and second input signals to derive first and second fundamental voltages, means for shifting the phase of said first fundamental voltage by 90-degrees relative to the phase of said second fundamental voltage, means for adding said shifted first fundamental voltage to said second fundamental voltage to produce a third fundamental voltage having a phase angle relative to said first fundamental voltage equal to the inverse tangent of the ratio of the amplitude of said second signal to the amplitude of said first signal, first and second amplitude comparison means connected to receive said first and third fundamental voltages, respectively, said first amplitude comparison means serving to transmit a triggering pulse when said first fundamental voltage passes through zero amplitude in the negative direction and said second amplitude comparison means serving to transmit a triggering pulse when said third fundamental voltage passes through zero amplitude in the negative direction, and a bistable circuit having first and second input terminals and first and second output terminals, said bistable circuit being connected to receive the outputs of said first and second amplitude comparison circuits at said first and second input terminals, respectively, whereby an output voltage is obtained between said first and second output terminals having an average value proportional to the phase angle between said first and third fundamental voltages and whereby the relative amplitude of said first and second signals may be determined from the amplitude of said output voltage.

4. Apparatus as in claim 3 in which the bistable circuit is one of the flip-flop type.

5. In a ratio detector of the character described for determining the relative amplitude of first and second input in phase complex waves, means for extracting the fundamental voltage of said first and second signals to derive a first and second fundamental voltage and for shifting the phase of said first fundamental voltage by 90-degrees relative to the phase of the said second fundamental voltage, means for producing third and fourth voltages of the same fundamental frequency, said third voltages of the same fundamental frequency, said third fundamental voltage being in phase with said shifted first fundamental voltage and said fourth fundamental voltage being equal in amplitude to said third fundamental voltage and 180-degrees out of phase with said third fundamental voltage, means for adding said second fundamental voltage to said third and fourth fundamental voltages to produce fifth and sixth fundamental voltages, said fifth and sixth fundamental voltages having a phase angle relative to said second fundamental voltage equal to the inverse tangent of the ratio of the amplitude of said second fundamental voltage to said third fundamental voltages, first and second amplitude comparisons circuits connected to receive said fifth and sixth fundamental voltages, said first amplitude comparison circuit being adjusted to transmit a pulse when said fifth fundamental voltage reaches a specified amplitude and said second amplitude comparison circuit being adjusted to transmit a pulse when said sixth fundamental voltage reaches the same specified amplitude, and a flip-flop circuit having first and second input terminals and first and second output terminals, said flip-flop circuit being connected to receive the outputs of said first and second amplitude comparison circuits at said first and second input terminals, respectively, whereby an output voltage is obtained between said first and second output terminals having an average value proportional to the phase angle between said fifth and sixth fundamental signals and whereby the ratio of the amplitude of said first and second signals may be determined from the amplitude of said output voltage.

6. Apparatus as in claim 5 wherein said means for extracting the fundamental of said first and second signal voltages to derive first and second fundamental voltages and to shift the phase of said first fundamental voltage by 90-degrees relative to the said second fundamental voltage includes a pair of coupled resonant circuits, wherein said means for producing said third and fourth voltages of the same fundamental frequency includes a center tapped transformer and a series resonant circuit, wherein said means for producing said second fundamental voltage includes a transformer having a pair of coupled resonant circuits, and wherein said means for adding said third and fourth voltages to said second fundamental voltage comprises a connection between the output of said pair of coupled resonant circuits and said center tap connection in the secondary circuit of said transformer.

7. In a ratio meter of the character described, means for extracting the fundamental of first and second in phase input complex signal voltages to derive first and second fundamental voltages, means for shifting the phase of one of said fundamental voltages relative to the other, means for receiving said fundamental voltages which have been phase shifted one relative to the other and forming voltages having a phase angle which is related to the ratio of amplitude of said first and second signals, and means serving to measure the phase angle to thereby indicate the ratio of said first and second signals.

8. In a ratio meter of the character described, means for extracting the fundamental of first and second in phase input complex signal voltages to derive first and second fundamental voltages, means for shifting the phase of one of said voltages relative to the other, means for receiving said fundamental voltages which have been phase shifted one relative to the other and deriving voltages having a phase angle which is related to the ratio of amplitude of said first and second signal voltages, means responsive to said derived voltages and serving to form triggering pulses when each of said voltages passes through zero amplitude in a negative direction, and means responsive to said pulses for indicating the time displacement of the pulses to thereby indicate the ratio of amplitude of said first and second signals.

9. Apparatus as in claim 8 in which said last named means includes a bistable flip-flop circuit responsive to said triggering pulses and serving to generate periodic pulses whose average value is proportional to the phase angle, and means responsive to the average value of said pulses thereby indicating the ratio of amplitudes of said first and second signals.

10. Apparatus as in claim 8 in which said means for forming voltages having a phase angle which is related to the ratio of amplitude of said first and second signals comprises a first filter which includes a series-resonant circuit coupled to a parallel resonant circuit, said parallel resonant circuit including a center tapped inductance, and a second filter circuit which includes two coupled parallel resonant circuits, the output of the said second filter being applied to the center tap.

11. In a ratio meter of the character described, means for extracting the fundamental signal frequency of in phase first and second input complex waves to derive first and second in phase fundamental voltages, means for shifting the phase of the first of said fundamental voltages by 90-degrees relative to the second, means for adding said shifted first fundamental voltage to said second fundamental voltage to produce a third fundamental voltage having a phase angle relative to said first fundamental voltage equal to the inverse tangent of the ratio of the amplitude of the second signal to the amplitude of the first signal, means responsive to said first and third fundamental voltages serving to derive triggering pulses when said first fundamental voltage reaches a predetermined amplitude and another triggering pulse when said third fundamental voltage reaches the same predetermined amplitude, and means responsive to said triggering pulses for indicating the time displacement of said pulses to thereby indicate the ratio of amplitude of the first and second signals.

12. In a ratio detector of the character described for determining the relative amplitude of first and second input in phase complex waves, means for extracting the fundamental voltages of said first and second complex waves to derive a first and second fundamental voltage and for shifting the phase of said first fundamental voltage by 90-degrees relative to the phase of said second fundamental voltage, means for producing third and fourth voltages of the same fundamental frequency, said third fundamental voltage being in phase with said shifted first fundamental voltage and said fourth fundamental voltage being equal in amplitude to said third fundamental voltage and 180-degrees out of phase with said third fundamental voltage, means for adding said second fundamental voltage to said third and fourth fundamental voltages to produce fifth and sixth fundamental voltages, said fifth and sixth fundamental voltages having a phase angle relative to said second fundamental voltage equal to the inverse tangent of the ratio of the amplitude of said second fundamental voltage to said third fundamental voltages, first and second amplitude comparison circuits connected to receive said fifth and sixth fundamental voltages, said first amplitude comparison circuit being adjusted to transmit a pulse when said fifth fundamental voltage reaches a specified amplitude and said second amplitude comparison circuit being adjusted to transmit a pulse when said sixth fundamental voltage reaches the same specified amplitude, and means responsive to said triggering pulses for indicating the time displacement of said pulses to thereby indicate the ratio of amplitude of the first and second signals.

13. In a ratio meter of the character described, means for extracting the fundamental frequency of first and second in phase input complex signal voltages to derive first and second fundamental voltages, means for shifting the phase of one of said voltages relative to the other, means for receiving said fundamental voltages which have been phase shifted one relative to the other and deriving voltages having a phase angle which is related to the ratio of amplitude of said first and second signal voltages, means responsive to said derived voltages serving to form triggering pulses when each of said voltages reaches a predetermined amplitude, and means responsive to said pulses for indicating the time displacement of the pulses to thereby indicate the ratio of amplitude of said first and second signals.

14. Apparatus as in claim 13 in which said last named means includes a bistable flip-flop circuit responsive to said triggering pulses and serving to generate periodic pulses whose average value is proportional to the phase angle, and means responsive to the average value of said pulses to thereby indicate the ratio of amplitudes of said first and second signals.

15. Apparatus as in claim 13 in which said means for forming voltages having a phase angle which is related to the ratio of amplitude of said first and second signals comprises a first filter which includes a series resonance circuit coupled to a parallel resonance circuit, said parallel resonance circuit including a center tapped inductance, and a second filter circuit which includes two coupled parallel resonance circuits, the output of said second filter being applied to the center tap.

16. In a ratio detector of the character described for determining the relative amplitude of the first and second in phase input complex waves, means for extracting the fundamental voltage of said first and second waves to derive a first and second fundamental voltage and for shifting the phase of said first fundamental voltage by 90-degrees relative to the phase of said second fundamental voltage, means for producing third and fourth voltages of the same fundamental frequency, said third fundamental voltage being in phase with said shifted first fundamental voltage and said fourth fundamental voltage being equal in amplitude to said third fundamental voltage and 180-degrees out of phase with said third fundamental voltage, means for adding said second fundamental voltage to said third and fourth fundamental voltages to produce fifth and sixth fundamental voltages, said fifth and sixth fundamental voltages having a phase angle relative to said second fundamental voltage equal to the inverse tangent of the ratio of the amplitude of the said second voltage to said third fundamental voltage, and means serving to measure the phase angle between said fifth and sixth fundamental voltages to thereby indicate the ratio of said first and second signals.

References Cited in the file of this patent
UNITED STATES PATENTS
2,370,692    Shepherd _____ Mar. 6, 1955